July 9, 1957
C. H. JOHNSON
2,798,395
TURRET LATHE WITH SERVO TRACER TURRET TOOL
Filed Nov. 23, 1953
4 Sheets-Sheet 1
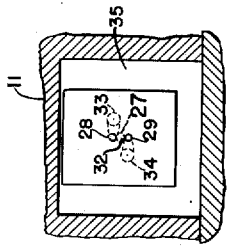
FIG. 10.
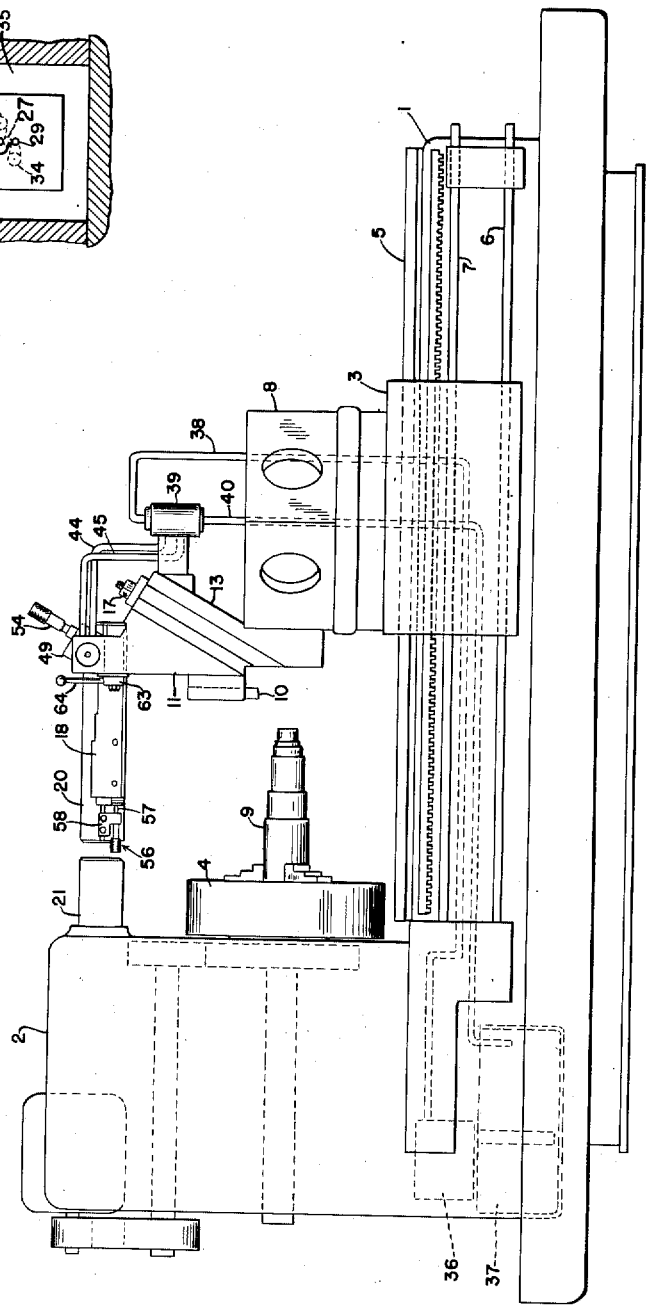
FIG. I.
INVENTOR.
CHARLES H. JOHNSON
BY
Attorneys

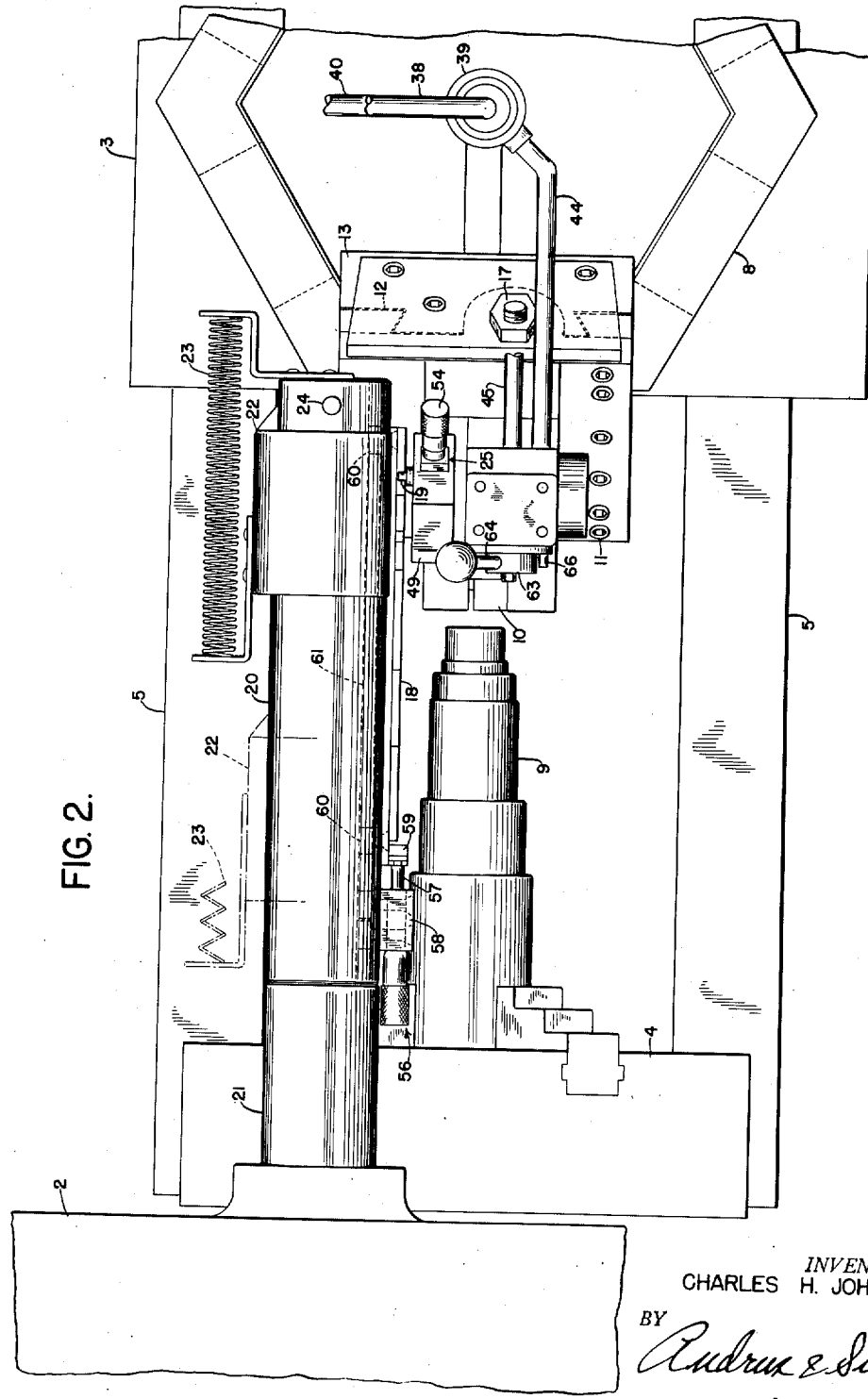

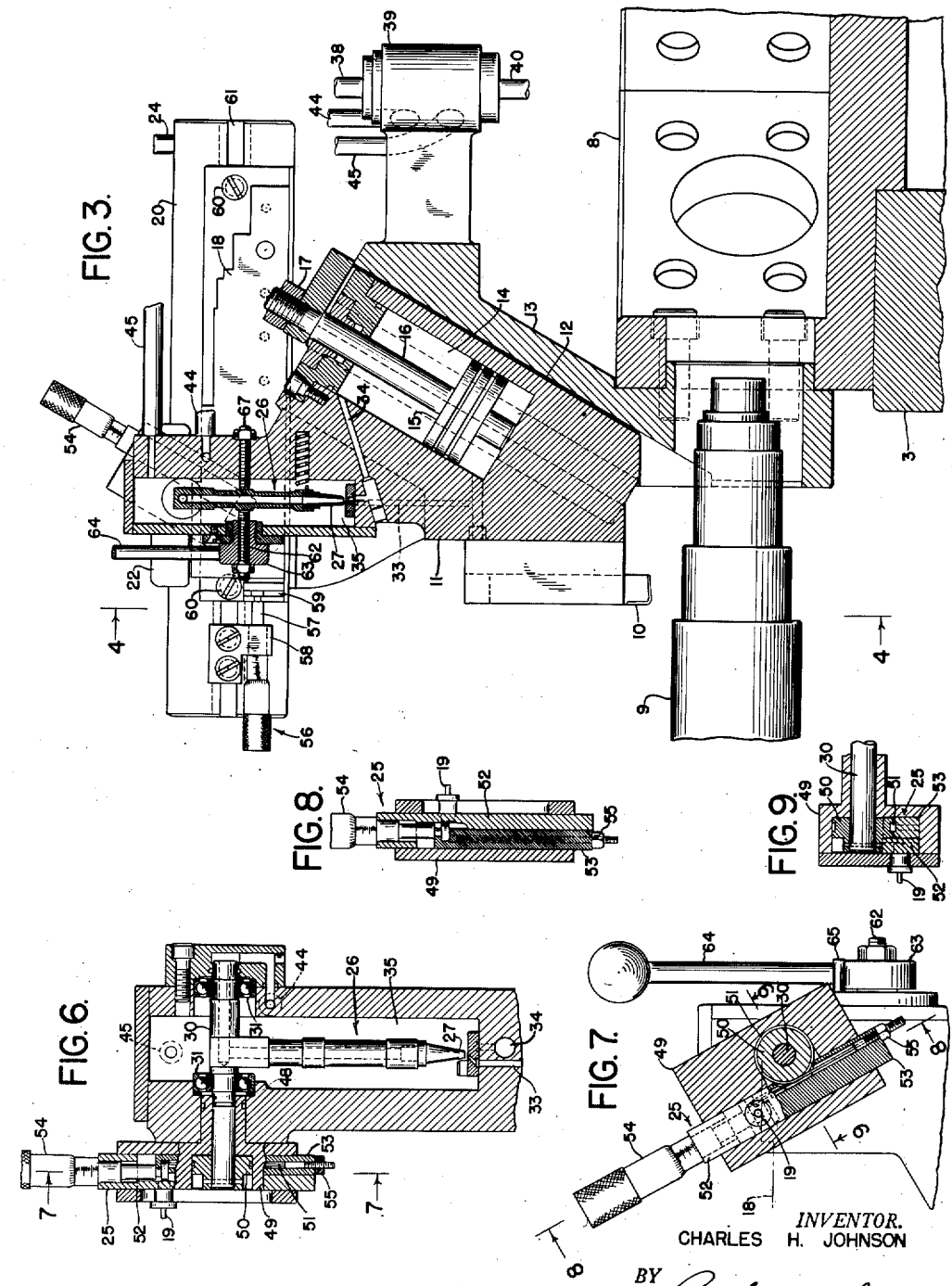

July 9, 1957    C. H. JOHNSON    2,798,395
TURRET LATHE WITH SERVO TRACER TURRET TOOL
Filed Nov. 23, 1953    4 Sheets-Sheet 4
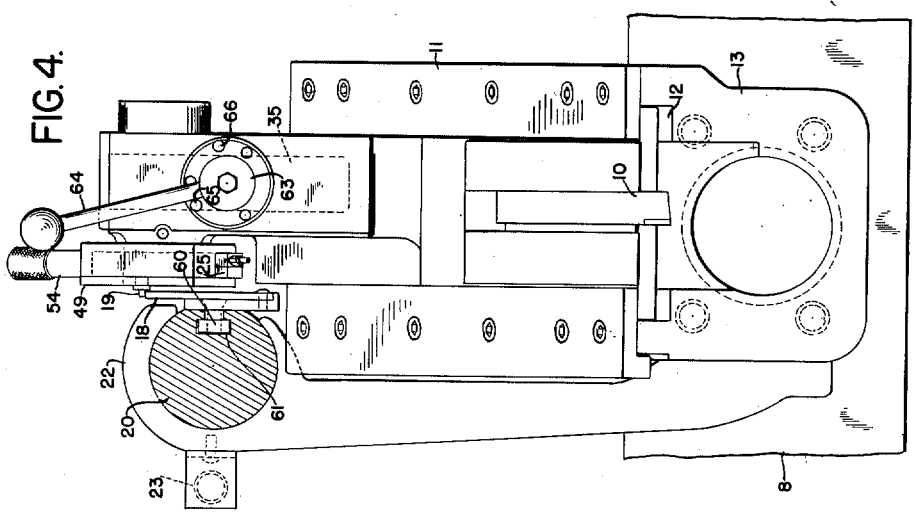
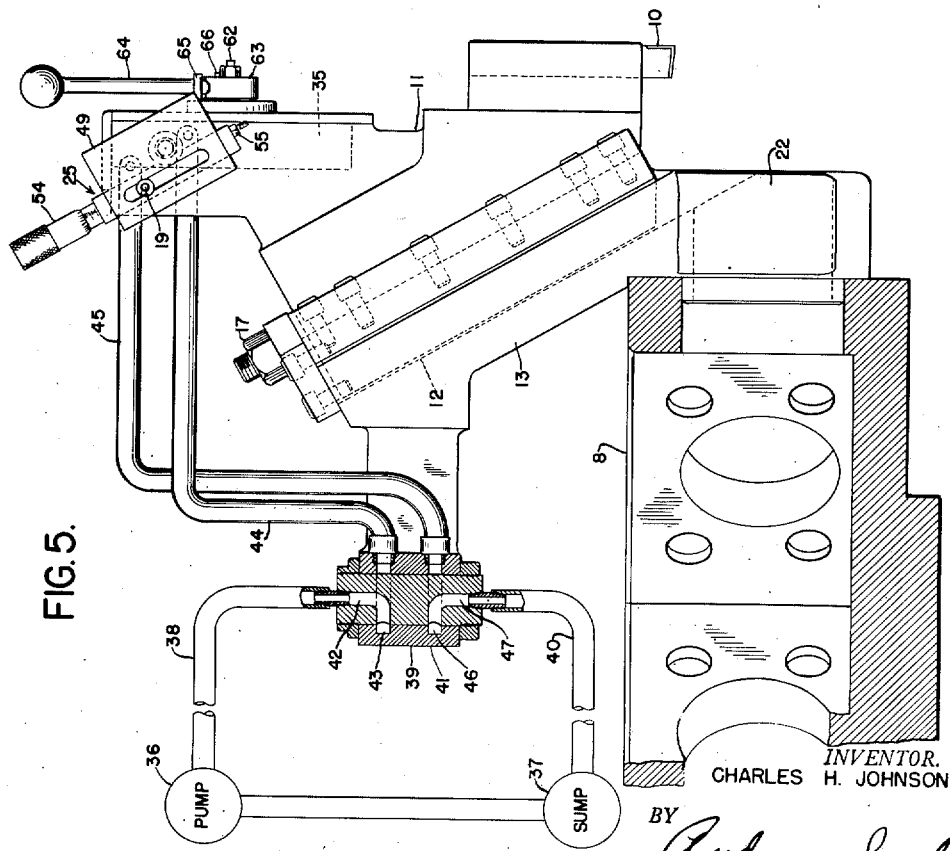
INVENTOR.
CHARLES H. JOHNSON
BY
Andrus & Sceales
Attorneys United States Patent Office 2,798,395
Patented July 9, 1957

2,798,395
TURRET LATHE WITH SERVO TRACER TURRET TOOL

Charles H. Johnson, Madison, Wis., assignor to Gisholt Machine Company, Madison, Wis., a corporation of Wisconsin Application November 23, 1953, Serial No. 393,780

3 Claims. (Cl. 82—14)

This invention relates to a lathe with a servo tracer turret tool.

Lathes have employed servo tracer mechanisms for controlling the movement of a tool slide upon a carriage as the latter moves, to produce a cut which corresponds to a given pattern. Such mechanism has been applied similarly to the movement of cross feeding turret slides. These servo tracer mechanisms have been generally too complicated and bulky to be applied to the control of a single tool on a turret face.

Contour control of a single tool on a turret face has been attempted by employing direct cam action, but such attempts have been rare due to limitations as to forces to prevent possible distortion and inaccuracies, and to limitations as to contour, it being impossible to provide abrupt or right angle changes in angularity.

The present invention solves these difficulties and provides a power actuated servo tracer control of a small tool slide on one face of a turret, thereby greatly enlarging the scope of usefulness of the turret.

In carrying out the invention a power actuated tool slide is mounted on one face of the turret and is controlled by servo tracer mechanism responsive to a movement of the turret relative to the rotating workpiece during operation of the lathe.

The two elements of the tracer mechanism, viz. the cam and follower, are made responsive to the relative movement between the turret and the workpiece, and both elements are carried by the turret with adequate provision for effecting the described relative movement of the elements without interfering with turret indexing operations.

The invention has been embodied in a turret lathe illustrated in the accompanying drawings and which constitutes the best mode presently contemplated of carrying out the invention.

In the drawings:

Figure 1 is a front elevation of a turret lathe showing the servo tracer tool mounted on the turret indexed into operative position, with the turret in a retracted position after completion of a machining cycle;

Fig. 2 is a fragmentary top plan view of the lathe showing the tool indexed into operative position;

Fig. 3 is a detail front side elevation of the tool mounting with parts broken away and sectioned and with the cam carrying bar pushed back against its spring;

Fig. 4 is an elevation of the mounting taken on line 4—4 of Fig. 3 with parts in section;

Fig. 5 is a rear side elevation of the mounting with parts broken away and sectioned;

Fig. 6 is an enlarged detail section showing the tracer mechanism;

Fig. 7 is an enlarged detail section taken partially on line 7—7 of Fig. 6 showing the micro-adjuster for the jet nozzle;

Fig. 8 is a section taken on line 8—8 of Fig. 7 longitudinally of the tracer mechanism;

Fig. 9 is a detail section taken on line 9—9 of Fig. 7; and

Fig. 10 is an enlarged plan view of the jet ports with the nozzle mouth dotted.

The turret lathe illustrated in the drawings comprises a bed 1 having a headstock 2 at one end and a turret carriage 3 at the opposite end.

The headstock 2 contains a rotary work spindle carrying a work chuck 4 on its operative end, and further contains the drive for the spindle and for the turret carriage 3.

The turret carriage 3 is mounted on suitable ways 5 on the bed 1 to move axially toward and away from the headstock 2 and chuck 4. Movement of the carriage 3 is effected, as shown schematically in Figure 1, by suitable rotary traverse and feed shafts 6 and 7, respectively, extending from the headstock and driven by gearing therein synchronism with the rotation of the spindle and chuck 4.

A turret 8 is mounted on the carriage 3 or on a cross slide thereon, in the usual manner, and has a plurality of faces, usually six, for receiving separate tools to be indexed in sequence relative to the chuck 4 and the workpiece 9 carried by the chuck.

In the present instance at least one of the tools carried by the turret 8 is servo tracer controlled to move relative to the turret. For this purpose the tool 10 is carried by a slide 11 mounted for reciprocation in a T-slot way 12 in a base 13 secured to the face of turret 8.

Slide 11 is actuated by a double acting hydraulic cylinder 14 and piston 15, the latter being secured to a bracket on base 13 by means of a piston rod 16 and nut 17 threaded upon the outer end thereof. The cylinder 14 is within slide 11 and moves relative to the stationary piston to effect movement of the slide.

The slide 11 is shown disposed at an inclination to the axis of the rotating workpiece 9 so as to effect movement of the tool 10 to different radial positions relative to the workpiece for machining areas of different diameters upon the latter as the turret carriage 3 moves forwardly. Various cuts may be obtained from a variation in circumferential surface for the workpice to an end facing thereof.

The control of slide 11 is effected by a cam pattern 18, a tracer finger 19, and suitable hydraulic servo-mechanism effecting a differential pressure on opposite sides of piston 15 in response to the pattern as the follower is made to travel therealong by movement of the carriage 3 and turret 8.

In the construction illustrated the cam 18 is mounted upon a longitudinally movable bar 20 carried by base 13. Bar 20 is adapted to extend parallel to the direction of carriage movement and to abut a stop 21 adjustably extending from headstock 2 so that as carriage 3 moves forward bar 20 engages stop 21 and ceases to move, sliding in its bearing support 22 on base 13. A tension spring 23 biases bar 20 to a normal forward position in support 22 and lightly opposes the rearward movement of the bar in the support. A stop 24 on bar 20 engages support 22 to determine the normal position for the bar.

The tracer finger 19 is carried by a tracer slide 25 which in turn is carried by tool slide 11 and is disposed to move relative to the tool slide 11 in a direction substantially parallel thereto. Movement of tracer slide 25 in either direction effected by tracer finger 19 riding upon cam 18 as carriage 3 moves forward, is translated by a suitable hydraulic servomechanism into a corresponding movement of tool slide 11 on turret 8.

The servo-mechanism illustrated comprises the hydraulic power cylinder 14 and piston 15 adapted to actuate slide 11, and a servo-valve 26 adapted to supply hydraulic pressure to the opposite sides of piston 15.

When the course of cam 18 to be traversed by tracer 19 is parallel to the direction of movement of carriage 3 the servo-valve 26 delivers a balanced hydraulic force upon opposite sides of piston 15, thereby retaining tool slide 11 against movement and tool 10 will move only with carriage 3.

When the course of cam 18 to be traversed by tracer finger 19 is angular with respect to the direction of movement of carriage 3 the servo-valve 26 delivers a differential hydraulic force upon opposite sides of piston 15 thereby moving slide 11 in the direction of tracer movement until by servo action the effect of the cam has been fully translated into a corresponding angular tool movement relative to the direction of movement of the tool effected by the movement of carriage 3.

The servo-valve 26 is shown as a jet valve, the same in principle as that described and shown in copending application Serial No. 348,302, filed April 13, 1953, by the present inventor for Jet Tracer Drive for Machine Tools. In general, the valve illustrated comprises a jet nozzle 27 facing a pair of ports 28 and 29 connected respectively to the opposite ends of cylinder 14.

The nozzle 27 is pivotally suspended by shaft 30 mounted in suitable bearings 31 in the body of slide 11, and is adapted to center itself with respect to the lip 32 between ports 28 and 29 and to be deflected from central position for adjustment of the forces on piston 15 in actuation of the device.

Cylinder 14 is disposed in the body of slide 11. Suitable passages 33 in the body of slide 11 connect port 28 with the lower end of cylinder 14. Similarly, suitable passages 34 in the body of slide 11 connect the port 29 with the upper end of cylinder 14.

The jet nozzle 27 and ports 28 and 29 are disposed in a chamber 35 in slide 11 and which is generally filled with a power liquid discharged by the nozzle and by the exhaust port.

Power liquid is supplied by a pump 36 in the lathe headstock and which is shown only schematically. The pump receives its supply from a sump tank 37 conveniently located in the base of the headstock and similarly shown schematically.

A flexible supply conduit 38 connects the outlet of pump 36 to a header coupling 39 carried by base 13 and disposed vertically on the axis of turret 8. A similar flexible return conduit 40 connects header 39 to sump tank 37.

Header 39 is rotatably mounted in bracket 41 on base 13 and a passage 42 leads from the connection for conduit 38 to an annular groove 43 in the header and which registers at all times with a passage 44 leading to the end of shaft 30. Shaft 30 is hollow from passage 44 to a passage extending downwardly to the mouth of the jet nozzle 27.

A return passage 45 leads from chamber 35 to an annular groove 46 in header 39 and which in turn is connected by a passage 47 to the connection for conduit 40.

The deflection of jet nozzle 27 by means of tracer finger 19 requires the translation of the reciprocatory movement of tracer slide 25 into rotary motion of shaft 30 which carries the jet nozzle 27. For this purpose the solid end of shaft 30 extends through a seal 48 in the wall of chamber 35 into a housing 49 for tracer slide 25. A circumferentially grooved wheel 50 is secured upon shaft 30 in housing 49. A tension wire 51 is wound upon grooved wheel 50 and has its ends extending oppositely parallel to the movement of slide 25 and secured to the slide, whereby movement of the slide in either direction effects a corresponding movement of wire 51 and turning movement of wheel 50 to deflect the jet nozzle 27 relative to ports 28 and 29.

A fine adjustment of nozzle position relative to tracer finger 19 is provided by longitudinally splitting tracer slide 25 into two adjacent parts 52 and 53 and providing a micrometer 54 at the upper end of the same to hold the parts in adjusted position.

For this purpose tracer finger 19 is carried by slide part 52 and the wire 51 is carried by slide part 53. The micrometer 54 is carried by slide part 52 and has the inner end of its screw secured to the slide part 53.

The wire 51 can be adjusted in tension by means of the threaded nut 55 on its lower end bearing upwardly against the end of the wire slide 53. The wire 51 is preferably a coiled piano wire which can be tensioned as desired.

The cam pattern 18 is made adjustable in position relative to the workpiece during the effective operation of tracer finger 19 either by making the stop 21 adjustable or by providing a micrometer adjustment 56 for the cam on bar 20 as shown in Fig. 3. If desired both adjustments may be employed, the stop 21 being a coarse adjustment and the micrometer adjustment 56 being a fine adjustment.

The micrometer adjustment 56 comprises a micrometer screw 57 carried on a bracket 58 on bar 20 and extending longitudinally of the bar. The head of screw 57 is engaged in a recess in a flange 59 on the end of cam plate 18 to move the latter longitudinally of bar 20 as the screw is adjusted.

Cam plate 18 is mounted slidably upon bar 20 by means of T-lugs 60 secured to the back of the cam plate and having their heads slidable in a longitudinally T-slot 61 in the face of bar 20.

In operation of the lathe when turret 8 is indexed to present tool 10 to work 9 and carriage 3 moves forward toward the rotating workpiece, bar 20 engages stop 21 before the cut begins and tracer finger 19 starts moving along cam 18. As the cut proceeds tool 10 is controlled in position and moved relative to the axis of the rotating workpiece in accordance with the following of cam 18 by tracer finger 19 which effects a sensitive control of the jet valve 26.

Upon completion of the cut the jet nozzle 27 is either manually or automatically moved to supply power liquid to the upper end of cylinder 14 to raise tool 10 radially from the workpiece and hold the same in raised retracted position during back traverse of carriage 3. In the construction shown this retracting of the tool is accomplished by a rod 62 adjustably mounted in a threaded plug 63 in the wall of chamber 35 and having its inner end adjacent and facing the body of jet nozzle 27. By turning of plug 63 in the wall of jet chamber 35 the inner end is made to approach or to retract from the tracer nozzle 27.

Turning of plug 63 is effected by radial arm 64 which is manually or automatically moved between two extreme positions which are determined by stops 65 and 66 on the face of slide 11 adjacent plug 63.

At the end of a cut, arm 64 is moved to the right against stop 66 and thereby threads plug 63 inwardly to effect engagement of jet nozzle 27 by the inner end of rod 62 which pushes the nozzle over port 29 whereby power fluid is directed to the upper end of cylinder 14 to raise slide 11 and tool 10. When the top of cylinder 14 engages the bracket on base 13 which holds piston rod 16 and piston 15 stationary within the cylinder, power fluid continues to flow from jet nozzle 27 into port 29 and the continued fluid pressure within the cylinder by reason of the jet retains the cylinder in tool retracted position.

When carriage 3 stops its back traverse the arm 64 is moved to the left against stop 65 whereby plug 63 is threaded outwardly and the inner end of rod 62 is withdrawn from jet nozzle 27 and thereafter serves as a stop for extreme nozzle deflection. A corresponding stop 67 is adjustably secured in the opposite wall of jet chamber 35 to limit deflection of the jet nozzle.

The cycle is repeated each time the turret is indexed to present tool 10 to the work.

During the cut the servo-mechanism functions to effect a tool movement simulating closely the pattern of cam 18. This servo-action results from the fact that for any given displacement of tracer slide 25 relative to slide 11 the jet effects actuation of power cylinder 14 in the same direction until jet nozzle 27 is returned to a non-deflected position holding cylinder 14 against further actuation.

The cam pattern 18 and tracer finger 19 are shown as carried by the turret, but in effect during operation of the machine after bar 20 engages stop 21 and is held stationary thereby the cam pattern functions as though bar 20 and stop 21 were integral and the cam pattern were carried by the headstock or bed.

The invention substantially enlarges the scope of the cycle of operation of turrets in lathes and extends the usefulness of such lathes.

The accompanying claims particularly point out and distinctly set forth the subject matter regarded as the invention.

I claim:

1. In combination in a machine tool, a carriage mounted to move relative to a workpiece in a first direction to traverse the surface to be cut, a tool slide mounted on said carriage to move relative thereto in a second direction at an angle to said carriage movement to determine the contour of cut, a tool on said slide and adapted to be fed to the workpiece by said carriage, means to move said carriage in said first direction, separate power means to move said tool slide in said second direction, pattern and tracer elements carried as a unit by said carriage, means mounting one of said elements for sliding movement on said carriage, means mounting the other of said elements on said tool slide, stop means disposed in the path of said one element to stop movement of said one element as said carriage is fed to the workpiece in said first direction to position the tool to the workpiece whereby continued movement of said carriage in said first direction will traverse the surface to be cut with said tool and will move said other element past said one element to trace the pattern for contour of cut in response to the feeding movement of said carriage, mechanism having a control member actuated by said tracer element, and means connecting said control member to said separate power means for controlling the actuation of said tool slide on said carriage in accordance with relative displacements of said tracer element in response to pattern contour changes, the construction being such that movement of the carriage away from the work to inoperative position likewise moves the pattern and tracer elements away from the work.

2. A turret lathe with servo tracer turret tool, comprising in combination, a carriage mounted to move relative to a workpiece in a first direction to traverse the surface to be cut, a tool turret on said carriage and rotatably indexable thereon to position successive tools for sequential use in a machining cycle of a given workpiece, an attachment removably secured to said turret and including a tool slide mounted thereon to move relative to said turret and carriage in a second direction at an angle to said carriage movement to determine the contour of cut, a tool on said slide and adapted to be fed to the workpiece by said carriage, means to move said carriage in said first direction, separate power means to move said tool slide in said second direction, pattern and tracer elements constituting a part of said attachment on said turret, means mounting one of said elements for sliding movement on said turret relative to said carriage, means mounting the other of said elements on said tool slide, stop means disposed in the path of said one element to stop movement of said one element as said carriage is fed to the workpiece in said first direction to position the tool to the workpiece whereby continued movement of said carriage in said first direction will traverse the surface to be cut with said tool and will move said other element past said one element to trace the pattern for contour of cut in response to the feeding movement of said carriage, mechanism constituting a part of said attachment and having a control member actuated by said tracer element, and means connecting said control member to said separate power means for controlling the actuation of said tool slide on said turret in accordance with relative displacements of said tracer element in response to pattern contour changes, said attachment being free of said stop means and of the workpiece when said carriage is in tool retracted position to provide for indexing of said turret to present a different tool to the workpiece, and said stop means being disposed to avoid interference with successive tools on said turret as the latter is indexed to present the tools successively to the workpiece in a machining cycle.

3. A turret lathe with servo tracer turret tool, comprising in combination, a carriage mounted to move relative to a workpiece in a first direction to traverse the surface to be cut, a tool turret on said carriage and rotatably indexable thereon to position successive tools for sequential use in a machining cycle of a given workpiece, an attachment removably secured to said turret and including a tool slide mounted thereon to move relative to said turret and carriage in a second direction at an angle to said carriage movement to determine the contour of cut, a tool on said slide and adapted to be fed to the workpiece by said carriage, means to move said carriage in said first direction to advance and retract said tool relative to the workpiece and to feed said tool, a hydraulic motor constituting a part of said attachment and having its movable member connected to said tool slide to move said tool slide in said second direction, a source of hydraulic power for said motor and separate from said attachment, rotatable header means connecting said power source to said motor and carried by said attachment with its axis parallel to the axis of rotation of said turret, pattern and tracer elements constituting a part of said attachment on said turret, means mounting one of said elements for sliding movement on said relative to said carriage, means mounting the other of said elements on said tool slide, stop means disposed in the path of said one element to stop movement of said one element as said carriage is fed to the workpiece in said first direction to position the tool to the workpiece whereby continued movement of said carriage in said first direction will traverse the surface to be cut with said tool and will move said other element past said one element to trace the pattern for contour of cut in response to the feeding movement of said carriage, and servo mechanism constituting a part of said attachment and having a control valve actuated by said tracer element and connected between said power source and said motor to control the actuation of said tool slide on said turret in accordance with relative displacements of said tracer element in response to pattern contour changes, said attachment being free of said stop means and of the workpiece when said carriage is in tool retracted position to provide for indexing of said turret to present a different tool to the workpiece, and said stop means being disposed to avoid interference with successive tools on said turret as the latter is indexed to present the tools successively to the workpiece in a machining cycle.

References Cited in the file of this patent
UNITED STATES PATENTS

| | | |
|---|---|---|
| 1,677,131 | Cole | July 17, 1928 |
| 1,678,924 | Strindberg | July 31, 1928 |
| 1,855,930 | Stull | Apr. 26, 1932 |
| 2,380,357 | Ziebolz | July 10, 1945 |
| 2,587,542 | Siekmann | Feb. 26, 1952 |
| 2,603,117 | Turchan | July 15, 1952 |
| 2,678,579 | Siekmann | May 18, 1954 |
| 2,696,804 | Kendall | Dec. 14, 1954 |

UNITED STATES PATENT OFFICE

CERTIFICATE OF CORRECTION

Patent No. 2,798,395                                July 9, 1957

Charles H. Johnson

It is hereby certified that error appears in the printed specification of the above numbered patent requiring correction and that the said Letters Patent should read as corrected below.

Column 2, line 41, for "workpice" read -- workpiece --; column 6, line 38, after "said", first occurrence, insert -- turret --.

Signed and sealed this 8th day of October 1957.

(SEAL)
Attest:

KARL H. AXLINE                                          ROBERT C. WATSON
Attesting Officer                                    Commissioner of Patents